Patented July 7, 1936

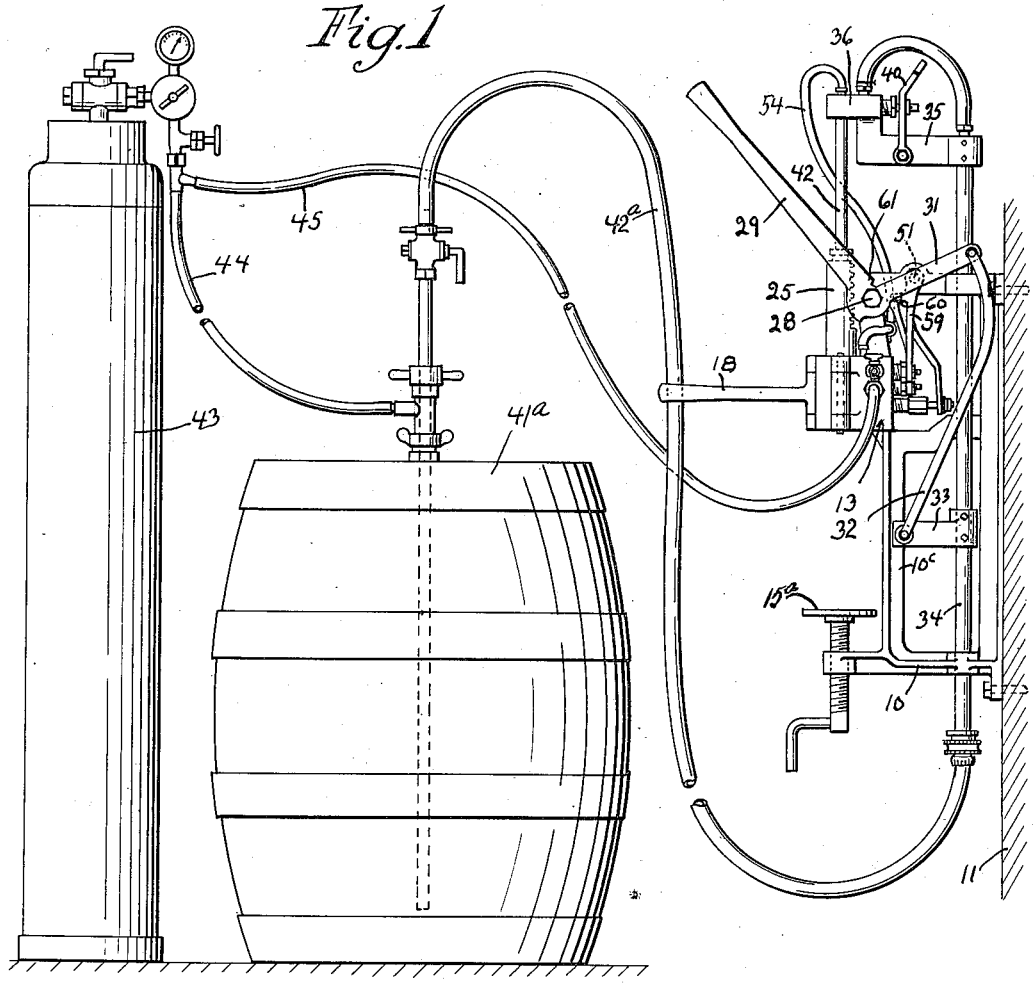

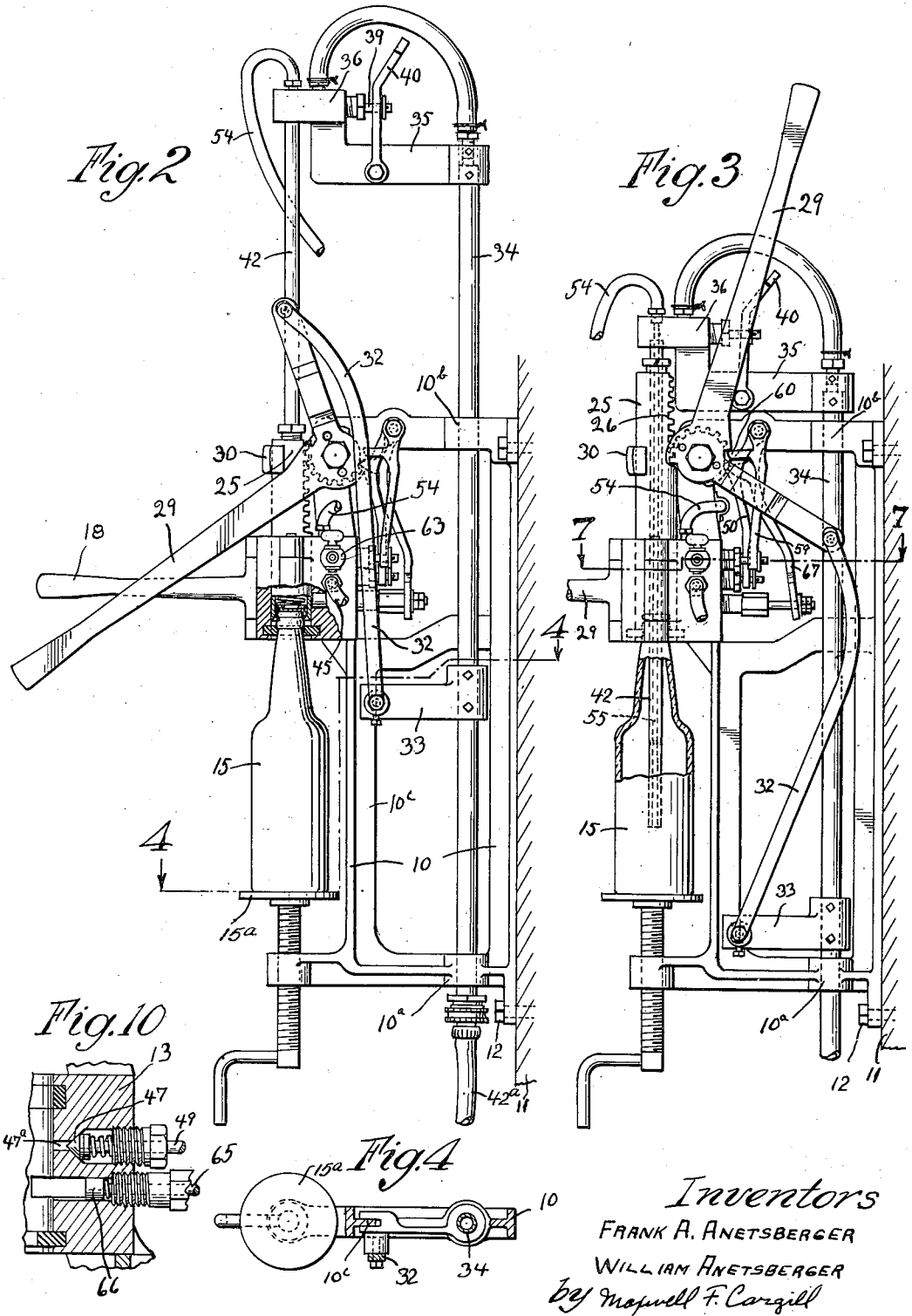

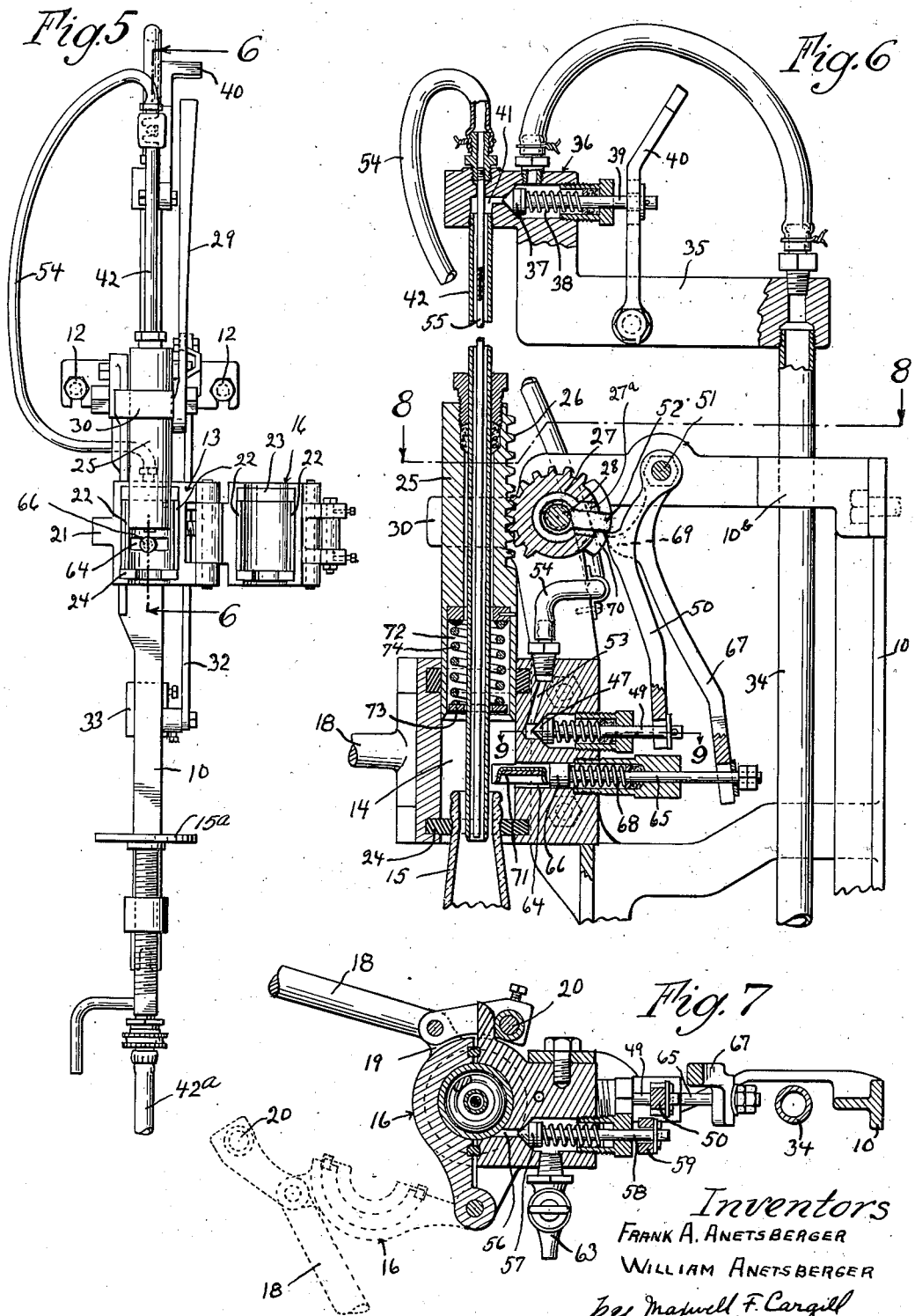

2,046,357

UNITED STATES PATENT OFFICE 2,046,357

APPARATUS FOR BOTTLING BEVERAGES

Frank A. Anetsberger and William Anetsberger, Chicago, Ill.

Application May 24, 1934, Serial No. 727,342

5 Claims. (Cl. 226—77)

This invention relates to improvements in method of and apparatus for bottling beverages.

One object of the invention is to provide a machine for filling bottles with carbonated beverages, such as beer or soft drinks, which prevents the escape of gas from the beverage and restrains the tendency of such beverages to foam.

Another object of the invention is to provide mechanism having means for enclosing the open end of a bottle, injecting gas, such as carbon dioxide, into the bottle to expel the air and build up a counter-pressure in the bottle to restrain foaming of the beverage as it enters the bottle, and then capping the bottle while the beverage is under said counter-pressure.

Another object of the invention is to provide mechanism having a filling tube which enters the bottle and discharges the beverage close to the bottom of the bottle and thus with minimum agitation of the beverage.

A further object of the invention is to provide a beverage filling tube within which is a gas delivery tube for delivering an initial charge of gas directly into the bottle to expel the air and build up a counter pressure within the bottle prior to the filling operation.

A further object of the invention is to provide a novel method of bottling gas-charged beverages.

Other objects relate to various features of construction and arrangement of parts which will be apparent from a consideration of the following specification and accompanying drawings, wherein Figure 1 is a side elevation of a machine embodying the present improvements, and shown connected by flexible tubing to a gas tank and also a beverage container such as a beer keg.

Figure 2 is a side elevation of the bottle filling and capping apparatus partly in section and showing the parts in capping position.

Figure 3 is a side elevation of the mechanism in bottle filling position.

Figure 4 is a horizontal sectional view taken on line 4—4 of Figure 2,

Figure 5 is a front elevation showing the chamber closure member in open position.

Figure 6 is a vertical sectional view taken on line 6—6 of Figure 5,

Figure 7 is a horizontal section taken on line 7—7 of Figure 3, the open position of the chamber closure member being shown in dotted lines, Figure 8 is a horizontal sectional view taken on line 8—8 of Figure 6, Figure 9 is a horizontal section taken on line 9—9 of Figure 6, and Figure 10 is a broken sectional view showing a modified gas inlet passage.

In bottling beverages, such as beer or soft drinks, for example, which have been previously carbonated or charged with carbon dioxide, it is desirable to prevent the beverage from foaming and losing its gas charge, and interfering with the rapid filling of the bottles. By the present improvements the tendency of the beverage to foam is restrained by maintaining a gas pressure constantly thereon until the caps have actually been applied to the bottles.

The present improvements are shown embodied in a hand operable bottle filling and capping apparatus, but it will be apparent that the principles of the invention can well be adapted to a fully automatic machine.

In the embodiment of the improvement selected for the purpose of illustration a frame 10 is provided adapted to be secured to any suitable support such as a post 11 or the like, as by means of screws or other fasteners 12. The frame 10 is provided with a chamber forming member indicated generally by the numeral 13. A cylindrical chamber 14 in the member 13 receives the open upper end of the bottle 15 to be filled, the bottle resting on the adjustable support 15a. The forward portion of the member 13 comprises a closure for the chamber and in fact cooperates with the member 13 in defining the chamber.

The closure member 16 is hinged to the member 13 at 17 and is provided with an operating handle 18 pivotally carried by the ears 19 and having a latch 20 which is adapted to be swung into engagement with a catch 21 for holding the closure member 16 in chamber forming position. The semicylindrical passages in the members 13 and 16 which comprise the chamber 14 are provided with vertical gaskets 22 which may be of rubber, and upper gaskets 23 of suitable material such as rawhide. Lower gaskets 24 preferably of rubber, are also provided, which embrace the neck of the bottle when the closure member is in closed position, to exclude air from the chamber and the bottle as indicated in Figure 6.

The vertical gaskets 22 close the vertical sides of the chamber against passage of air into the same or leakage of gas under pressure from the chamber, while gaskets 23 form a close seal with the piston shaped plunger 25 which has its lower end formed for pressing a conventional cap on the bottle.

The plunger 25 is provided with a rack 26 along the rear side thereof which meshes with a segmental pinion 27 which is carried by the pivot 28 and is operable by means of the handle 29. By moving the handle about the pivot 28 the plunger or capper member 25 will be moved vertically, the capper being guided axially of the chamber 14 by a member 30 which preferably is cast integrally with the frame 10. The handle 29 has a bell crank lever 31 extending rearwardly which is connected to the upper end of a link 32. The link is connected at its lower end to an arm 33 which in turn is secured to the pipe 34 which is slidably disposed in passages formed in the horizontal arms 10a and 10b of the frame 10. The forward end of the arm 33 may be bifurcated and thus guided in its sliding movements by the web 10c of the frame 10.

The upper end of the pipe 34 carries an arm or bracket 35 provided with a valve casing 36 which is shown in vertical section in Figure 6. The valve 37 having a spring 38 for moving the valve to closing position, is located in the valve casing 36 and has a stem 39 engaged by the arm 40 which is pivoted at its lower end to the arm 35. The valve 37 normally closes the passage 41 through which the beverage flowing from the container or keg 41a through flexible tube 42a and pipe 34 enters the reciprocable filling tube 42. Thus when the valve 37 is moved to open position, the beverage under pressure can flow through the chamber of the valve 36 into the filling tube 42, and thence into a bottle located or positioned on the support 15a and clamped with its open upper end within the chamber 14.

To maintain the charged beverage in quiescent condition during the filling operation, it is first desirable to subject the contents of the bottle and the chamber 14 to a counterpressure of gas preferably, of course, carbon dioxide. As shown in Figure 1, a gas tank 43 is connected by flexible tubes 44 and 45 to the container 41a and to the member 13 respectively. The pressure exerted on the contents of the container 41a assists in the passage of the beverage through the various tubes and passages by means of which it is conducted to the bottle. The tube 45 communicates with a valve passage 46 in the member 13, the flow through which passage is controlled by the valve 47 having a spring 48 tending to close the same. The valve is provided with a stem 49 which is engaged by the bifurcated end of a valve operating lever 50 which is pivoted at 51 to the horizontal arm 10b of the frame 10. The pinion 27 is provided with a recess 27a within which is a movable cam 52 which is arranged to engage the arm 50 to move the same counter-clockwise as viewed in Figure 6, to open the valve 47.

The gas flowing through the valve passage 46 past the valve 47 enters a passage 53 and thence flows through a flexible tube 54 into the pipe 55 which is disposed within the beverage filling pipe 42 as shown in Figure 6. Due to the lost-motion mounting of the cam 52 with respect to the pinion 27, the valve 47 will not be opened until the tubes 42 and 55 have been lowered well within the bottle. Instead of directing the gas through the tube 54 and through the pipe 55 as above described, it may be permitted to flow directly into the chamber 14 through an opening 47a provided for that purpose in the wall of the chamber communicating with the valve 47 as shown in Figure 10, if desired. However, it is preferred to conduct the gas downwardly through the tube 55 and discharge the same into the bottle to insure the expelling of the air from the bottle, as will be referred to hereinafter.

Communicating with the chamber 14 is an air exhaust port 56 normally closed by a spring actuated valve 57 having a stem 58 which is operable to open position by means of an arm 59 also carried by the pivot 51. The arm 59 is provided with a forward projection 60 adapted to be engaged by a lug 61 on the arm 29 when the latter has been moved to the maximum clockwise position, at which position, as shown in Figure 3, the arm also engages the lever 40 to open the valve 37. Thus as the beverage flows into the bottle, the displaced air can escape past the valve 57 and through the petcock 63.

Communicating with the chamber 14 is a bottle cap receiving recess 64 extending into which is a rod 65 having a head 66 which at the proper time during the sequence of the operation to be later described, moves to the left as viewed in Figure 6, to push the cap previously placed in the recess 54 over the end of the bottle, to be pressed into sealing position thereon by the downwardly moving piston 25. The rod 65 is provided with a spring 68 always tending to urge the same to the left, as viewed in Figure 6.

The outer end of the rod 65 is engaged by an arm 67 also mounted on the pivot 51. The arm 67 is provided with a projection 69 which is engaged by the cam 70 carried by the pinion 27 to hold the arm in retracted position during the filling operation.

The various steps in filling a bottle will now be described.

The handle 29 is moved to neutral position substantially as shown in Figure 1, that is, at an angle of about 45 degrees to the horizontal. In this position of the handle all the valves are closed, and the arm 67 is retracted so as to permit the insertion of a cap 71 in the recess 64. A bottle is then placed on the support 15a and the closure member moved to closed position. The handle is then moved upwardly toward the position shown in Figure 3, but prior to its reaching such position, the valve 47 will have been moved to open position by the arm 50, which in turn is actuated by the member 52 carried by the pinion 27 and thus admit gas into the bottle.

During this movement of the lever in clockwise position the pinion 27 raises the plunger 25 and by means of the link 32 lowers the bracket 33, pipe 34, arm 35 and the tubes 42 and 55. Thus the tubes 42 and 55 are moved downwardly into the bottle so that the gas being discharged therein will displace the air and force the same upwardly into the chamber 14. As the movement of the handle 29 is continued to the position shown in Figure 3, the cam 52 is moved by the projection 69 and cuts off the further admission of gas to the bottle. The handle, however, strikes the upper end of the lever 40 and opens the valve 37, thus permitting the beverage to flow down through the tube 42 into the bottle.

Substantially simultaneously with the opening of the valve 37, the valve 57 is also opened to permit the displaced air to escape through the petcock 63, the cock being adjusted to suitably restrict the escape of air so as to avoid the loss of the counter-pressure within the bottle and chamber 14.

When the bottle is filled to the desired extent, the handle 29 is moved from the position shown in Figure 3 toward the position shown in Figure 2. The movement of the handle out of contact with the lever 40 permits the spring 39 to close the valve 37 and cut off the further flow of beverage to the bottle. The counter-clockwise movement of the pinion 27, by means of the cam 52, momentarily opens the gas control valve 47 and injects a small charge of additional gas into the chamber and the bottle, it being understood, of course, that during this return movement the tubes 42 and 55 are being elevated from the bottle. The discharge of the additional gas takes place after the tubes 42 and 55 are above the liquid in the bottle, due to the delay in the opening of the gas valve caused by lost-motion mounting of the cam 52 within the recess 27a. The air exhaust control valve 47 is also closed during this return movement of the handle and thus the counter-pressure within the chamber 14 is preserved.

As the handle 29 continues its downward movement, the cam 70 permits the spring 68 to move the arm 67 to the left as viewed in Figure 6, and hence the member 66 pushes the cap 71 over the upper end of the bottle 15. This movement takes place just prior to the approach of the lower end of the cylinder 25 to capping position.

Further downward movement of the handle 29 causes the piston 25 to press the cap in sealing position on the end of the bottle.

The arm 18 is then swung to open position, another bottle is placed on the support 15a, and the same cycle of operations performed.

As shown in Figure 6 the capping member 25 is provided with a recess 72 in its lower end within which is disposed a presser plate 73, the upward movement of which relatively to the member 25 is resisted by a spring 74. The plate 74 presses the cap on the bottle on the downward stroke of the member 25, the lower beveled edge of the member serving to center the cap properly with respect to the bottle.

As will have been observed by the above description of the apparatus, the method employed is effective in bottling beer or other gas-charged beverages for the reason that the bottles are first charged with the gas which expels the air from the bottle and builds up a counter-pressure which prevents the beer from foaming even though the temperature is considerably above that generally considered essential in properly bottling such beverage. The gas pressure applied may of course be varied, as requirements may dictate, as from 6 to 15 pounds per square inch under the normal range of conditions, being less when the temperature of the beer is lower and higher when the temperature of the beer is higher since the beer foams more readily when warmer. The gas pressure can be adjusted to restrain the beer from foaming excessively and cause it to enter the bottles in a quiescent state.

Just before the handle 29 reaches the lowermost or capping position, an additional charge of gas preferably is discharged directly into the bottle as described above so that the capper portion of the neck of the bottle above the beer therein will be filled with the gas. The presence of the additional gas employed in the described method improves the taste of the beer and restrains tendency to foam until poured from the bottle.

While we have shown and described a commercial hand operable form of the invention for the purpose of illustrating the principle thereof and with which the novel method can be carried out, we do not wish to be restricted specifically thereto except as so limited by the appended claims.

We claim:

1. Bottle filling and capping apparatus comprising chamber forming means for engaging the open end of a bottle, means comprising a valve for injecting gas under pressure into said bottle to expel the air and build up a counter pressure therein, a reciprocable liquid filling tube movable through said chamber and into said bottle for delivering liquid thereto during the maintenance of the counter-pressure within said bottle, a valved air outlet port communicating with said chamber for relieving excess counter-pressure during the flow of liquid through said filling tube into said bottle, bottle capping means operable within said chamber during the maintenance of counter-pressure therein, operating means, and mechanism operable by said operating means for effecting the sequential operation of said gas injecting means, said filling tube, said air outlet valve and said capping means.

2. Bottle filling and capping apparatus comprising a member provided with a sealing chamber for the open end of a bottle to be filled, a reciprocable capping member operable within said chamber, a pair of concentric tubes extending through said capping member and slidable with respect thereto for delivering gas and liquid to said bottle, means for moving said tubes into and from said bottle, valves for controlling the passage of gas and liquid through said respective tubes, actuating mechanism for said capping member for moving the same to capping position, and means operable by said actuating mechanism for controlling said valves.

3. Bottle filling and capping apparatus comprising a member provided with a chamber for sealing the open end of a bottle to be filled, a frame supporting said member, a reciprocable liquid conduit comprising a discharge tube carried by said frame, operating means pivotally supported by said frame operatively linked to said conduit for raising and lowering said tube from and into said bottle, a reciprocable capping member within said chamber operable by said operating means, a gas conduit for delivering gas to said bottle, valves for controlling the flow of liquid and gas through said respective conduits, cap feeding means associated with said chamber, and actuating members for said valves and feeding means controlled by said operating means.

4. Apparatus for filling and capping beverage bottles comprising means forming an air tight capping chamber engaging the open end of a bottle, a cap recess communicating with said chamber, a reciprocable capping member movable within said chamber, a pair of concentric tubes movable through said capping member into said bottle, one of said tubes communicating with a source of gas under pressure, said other tube communicating with a beverage source, mechanism for moving said tubes into said bottle during the filling operation and removing the same therefrom after the completion of the operation, valves controlled by said mechanism for controlling the flow of gas and beverage through said tubes, and cap feeding means actuatable by said mechanism for moving a cap from said recess into position for engagement by said capping member.

5. Bottle filling and capping apparatus comprising means forming an air tight capping chamber engaging the upper end of a bottle, a reciprocable capping member slidable within said chamber, said member having a rack, an actuating pinion meshing with said rack and provided with a plurality of cam surfaces, a valved duct in said means communicating with said chamber for the egress of air, a second valved duct in said means for conveying gas under pressure to said bottle to build up a counter-pressure therein and expel air therefrom, means for admitting liquid to said bottle while subjected to said counter-pressure, levers controlled by said cams for controlling the opening and closing of said valves, and means operable within said chamber for feeding a cap to said capping member for capping said bottle during the maintenance of said counter-pressure.

FRANK A. ANETSBERGER.
WILLIAM ANETSBERGER.